(12) United States Patent
Ford

(10) Patent No.: US 10,623,431 B2
(45) Date of Patent: Apr. 14, 2020

(54) DISCERNING PSYCHOLOGICAL STATE FROM CORRELATED USER BEHAVIOR AND CONTEXTUAL INFORMATION

(71) Applicant: Forcepoint, LLC, Austin, TX (US)

(72) Inventor: Richard A. Ford, Austin, TX (US)

(73) Assignee: Forcepoint LLC, Austin, TX (US)

( * ) Notice: Subject to any disclaimer, the term of this patent is extended or adjusted under 35 U.S.C. 154(b) by 202 days.

(21) Appl. No.: 15/975,289

(22) Filed: May 9, 2018

(65) Prior Publication Data

US 2018/0332062 A1 Nov. 15, 2018

Related U.S. Application Data

(60) Provisional application No. 62/659,392, filed on Apr. 18, 2018, provisional application No. 62/537,102, filed on Jul. 26, 2017, provisional application No. 62/506,300, filed on May 15, 2017.

(51) Int. Cl.
*H04L 29/06* (2006.01)
*H04L 29/08* (2006.01)
*H04W 12/00* (2009.01)

(52) U.S. Cl.
CPC ...... *H04L 63/1425* (2013.01); *H04L 63/1416* (2013.01); *H04L 63/1441* (2013.01); *H04L 67/10* (2013.01); *H04W 12/00505* (2019.01); *H04W 12/00508* (2019.01)

(58) Field of Classification Search
CPC . H04L 63/1425; H04L 67/10; H04L 63/1416; H04L 63/1441; H04W 12/00505; H04W 12/00508
See application file for complete search history.

(56) References Cited

U.S. PATENT DOCUMENTS

| 7,395,201 | B2 | 7/2008 | Shaw | |
|---|---|---|---|---|
| 8,176,159 | B2 | 5/2012 | Kashi | |
| 8,549,629 | B1 * | 10/2013 | McCreesh | G06F 21/316 726/22 |
| 8,775,162 | B2 | 7/2014 | Shaw | |
| 8,918,903 | B1 * | 12/2014 | Schepis | G06F 21/316 709/224 |
| 8,963,806 | B1 | 2/2015 | Starner et al. | |
| 9,224,008 | B1 | 12/2015 | De et al. | |

(Continued)

OTHER PUBLICATIONS guardtime.com, KSI Blockchain Technology, printed Jul. 13, 2017.

(Continued)

*Primary Examiner* — Darren B Schwartz
(74) *Attorney, Agent, or Firm* — Terrile, Cannatti & Chambers; Stephen A. Terrile

(57) ABSTRACT

A method, system and computer-usable medium for performing a psychological profile operation. The psychological profile operation includes: monitoring user interactions between a user and an information handling system; converting the user interactions into electronic information representing the user interactions; determining when the user interactions are associated with generation of an electronic communication; associating the user interactions with the electronic communication; and, generating a psychological profile of the user based upon the user interactions and the electronic communication, the psychological profile comprising information regarding a psychological state of the user.

20 Claims, 10 Drawing Sheets

(56) References Cited

U.S. PATENT DOCUMENTS

| | | | |
|---|---|---|---|
| 9,253,181 B2 | 2/2016 | Liu et al. | |
| 9,275,345 B1 | 3/2016 | Song et al. | |
| 9,393,488 B2 | 7/2016 | Brownlow et al. | |
| 9,514,293 B1 | 12/2016 | Moritz et al. | |
| 9,516,035 B1 | 12/2016 | Moritz et al. | |
| 9,614,920 B1 | 4/2017 | Agarwal et al. | |
| 9,798,757 B2 | 10/2017 | Greene et al. | |
| 9,911,290 B1 | 3/2018 | Zalewski et al. | |
| 10,013,728 B2 | 7/2018 | Schechter et al. | |
| 10,019,561 B1 | 7/2018 | Shelton et al. | |
| 10,020,076 B1 | 7/2018 | Anumalasetty et al. | |
| 10,052,026 B1 | 8/2018 | Tran | |
| 10,061,916 B1 | 8/2018 | Jiang et al. | |
| 10,063,562 B1 | 8/2018 | Molina-Markham et al. | |
| 10,091,180 B1 | 10/2018 | Moritz et al. | |
| 10,110,942 B2 | 10/2018 | Lyons et al. | |
| 10,114,935 B2 | 10/2018 | Das et al. | |
| 10,237,298 B1* | 3/2019 | Nguyen | H04L 67/14 |
| 10,424,296 B2* | 9/2019 | Penilla | H04L 67/306 |
| 2001/0040591 A1 | 11/2001 | Abbott et al. | |
| 2002/0083025 A1 | 6/2002 | Robarts et al. | |
| 2003/0154406 A1 | 8/2003 | Honarvar et al. | |
| 2003/0204720 A1 | 10/2003 | Schoen et al. | |
| 2003/0212546 A1* | 11/2003 | Shaw | G06F 17/279 704/9 |
| 2003/0217024 A1 | 11/2003 | Kocher | |
| 2004/0225877 A1* | 11/2004 | Huang | G06F 21/552 713/100 |
| 2005/0008148 A1* | 1/2005 | Jacobson | G06F 3/038 380/26 |
| 2005/0097364 A1 | 5/2005 | Edeki et al. | |
| 2006/0136332 A1 | 6/2006 | Ziegler | |
| 2006/0190822 A1 | 8/2006 | Sasson et al. | |
| 2006/0195328 A1 | 8/2006 | Abraham et al. | |
| 2007/0067853 A1 | 3/2007 | Ramsey | |
| 2007/0136573 A1 | 6/2007 | Steinberg | |
| 2007/0179351 A1 | 8/2007 | Kil et al. | |
| 2007/0206741 A1 | 9/2007 | Tiliks et al. | |
| 2008/0104415 A1* | 5/2008 | Palti-Wasserman | G06F 21/32 713/186 |
| 2008/0148376 A1 | 6/2008 | Onozawa et al. | |
| 2008/0170776 A1 | 7/2008 | Albertson et al. | |
| 2008/0218472 A1 | 9/2008 | Breen et al. | |
| 2008/0271143 A1 | 10/2008 | Stephens et al. | |
| 2008/0313500 A1 | 12/2008 | Strauss et al. | |
| 2009/0023422 A1 | 1/2009 | Macinnis et al. | |
| 2009/0149247 A1 | 6/2009 | Esbensen et al. | |
| 2009/0177626 A1 | 7/2009 | Lottero | |
| 2009/0177979 A1 | 7/2009 | Garbow et al. | |
| 2009/0199264 A1 | 8/2009 | Lang | |
| 2009/0199296 A1* | 8/2009 | Xie | G06F 21/316 726/23 |
| 2009/0292743 A1* | 11/2009 | Bigus | G06F 21/316 |
| 2009/0293121 A1* | 11/2009 | Bigus | G06F 21/316 726/22 |
| 2010/0146622 A1 | 6/2010 | Nordstrom et al. | |
| 2010/0205667 A1 | 8/2010 | Anderson et al. | |
| 2010/0257580 A1 | 10/2010 | Zhao | |
| 2010/0269175 A1 | 10/2010 | Stolfo et al. | |
| 2010/0332550 A1* | 12/2010 | Ainslie | G06F 21/316 707/802 |
| 2011/0004520 A1 | 1/2011 | Chou et al. | |
| 2011/0016534 A1 | 1/2011 | Jakobsson et al. | |
| 2011/0106829 A1 | 5/2011 | Pradhan et al. | |
| 2011/0185421 A1* | 7/2011 | Wittenstein | G06F 21/554 726/22 |
| 2011/0212770 A1 | 9/2011 | Ocko et al. | |
| 2011/0221568 A1 | 9/2011 | Giobbi | |
| 2011/0231770 A1* | 9/2011 | Tovar | G06F 21/6218 715/736 |
| 2011/0320816 A1* | 12/2011 | Yao | G06F 21/316 713/171 |
| 2012/0060219 A1* | 3/2012 | Larsson | G06F 21/554 726/23 |
| 2012/0079045 A1 | 3/2012 | Plotkin | |
| 2012/0084349 A1* | 4/2012 | Lee | G06Q 30/02 709/203 |
| 2012/0101970 A1 | 4/2012 | Zernik et al. | |
| 2012/0131657 A1 | 5/2012 | Sunstein et al. | |
| 2012/0137367 A1* | 5/2012 | Dupont | G06F 21/00 726/25 |
| 2012/0144468 A1 | 6/2012 | Pratt et al. | |
| 2012/0258437 A1 | 10/2012 | Sadeh-Koniecpol et al. | |
| 2012/0281885 A1 | 11/2012 | Syrdal et al. | |
| 2012/0297477 A1 | 11/2012 | Raviv | |
| 2013/0024239 A1 | 1/2013 | Baker et al. | |
| 2013/0042327 A1 | 2/2013 | Chow | |
| 2013/0044055 A1 | 2/2013 | Karmarkar et al. | |
| 2013/0055348 A1 | 2/2013 | Strauss et al. | |
| 2013/0055367 A1 | 2/2013 | Kshirsagar et al. | |
| 2013/0072169 A1* | 3/2013 | Ross | H04L 67/306 455/414.1 |
| 2013/0097237 A1 | 4/2013 | Kothari et al. | |
| 2013/0097701 A1 | 4/2013 | Moyle et al. | |
| 2013/0111586 A1 | 5/2013 | Jackson | |
| 2013/0124538 A1 | 5/2013 | Lee et al. | |
| 2013/0142363 A1 | 6/2013 | Amento et al. | |
| 2013/0151515 A1 | 6/2013 | Davis et al. | |
| 2013/0238540 A1* | 9/2013 | O'Donoghue | G06Q 99/00 706/46 |
| 2013/0252737 A1 | 9/2013 | Mescon et al. | |
| 2013/0263206 A1* | 10/2013 | Nefedov | G06F 21/6218 726/1 |
| 2013/0291099 A1 | 10/2013 | Donfried et al. | |
| 2013/0305357 A1 | 11/2013 | Ayyagari et al. | |
| 2014/0040309 A1 | 2/2014 | Meaney et al. | |
| 2014/0040989 A1 | 2/2014 | Davis et al. | |
| 2014/0095419 A1 | 4/2014 | Gandhi et al. | |
| 2014/0096215 A1 | 4/2014 | Hessler | |
| 2014/0114899 A1* | 4/2014 | Wan | G06N 5/04 706/47 |
| 2014/0199663 A1 | 7/2014 | Sadeh-Koniecpol et al. | |
| 2014/0207724 A1* | 7/2014 | Ledenev | G06F 21/316 706/47 |
| 2014/0282964 A1 | 9/2014 | Stubblefield et al. | |
| 2014/0283016 A1 | 9/2014 | Sambamurthy et al. | |
| 2014/0317726 A1* | 10/2014 | Turgeman | G06F 21/32 726/19 |
| 2014/0317734 A1 | 10/2014 | Valencia et al. | |
| 2014/0323106 A1 | 10/2014 | Nunally | |
| 2014/0333415 A1 | 11/2014 | Kursun | |
| 2014/0344015 A1 | 11/2014 | Puertolas-Montanes et al. | |
| 2014/0347479 A1 | 11/2014 | Givon | |
| 2015/0067845 A1 | 3/2015 | Chari et al. | |
| 2015/0109104 A1 | 4/2015 | Fadell et al. | |
| 2015/0161386 A1 | 6/2015 | Gupta et al. | |
| 2015/0180894 A1* | 6/2015 | Sadovsky | G06F 3/0481 726/22 |
| 2015/0205944 A1* | 7/2015 | Turgeman | G06F 21/316 726/7 |
| 2015/0205957 A1 | 7/2015 | Turgeman et al. | |
| 2015/0205958 A1* | 7/2015 | Turgeman | G06F 21/554 726/23 |
| 2015/0206102 A1 | 7/2015 | Cama et al. | |
| 2015/0213246 A1* | 7/2015 | Turgeman | G06F 21/32 726/23 |
| 2015/0220734 A1 | 8/2015 | Nalluri et al. | |
| 2015/0249718 A1 | 9/2015 | Huybregts et al. | |
| 2015/0254467 A1 | 9/2015 | Leuthardt et al. | |
| 2015/0310196 A1* | 10/2015 | Turgeman | G06F 21/552 726/19 |
| 2015/0324563 A1 | 11/2015 | Deutschmann et al. | |
| 2015/0339477 A1 | 11/2015 | Abrams et al. | |
| 2015/0358317 A1 | 12/2015 | Deutschmann et al. | |
| 2015/0363770 A1 | 12/2015 | Ronca et al. | |
| 2016/0029221 A1 | 1/2016 | Suarez Garcia et al. | |
| 2016/0110551 A1* | 4/2016 | Fugate | G06F 3/015 726/25 |
| 2016/0117500 A1 | 4/2016 | Li et al. | |
| 2016/0125176 A1* | 5/2016 | Scea | G06F 21/16 726/19 |
| 2016/0197904 A1 | 7/2016 | Taratine et al. | |

(56) References Cited

U.S. PATENT DOCUMENTS

| | | | |
|---|---|---|---|
| 2016/0203316 A1 | 7/2016 | Mace et al. | |
| 2016/0210407 A1 | 7/2016 | Hwang et al. | |
| 2016/0212172 A1 | 7/2016 | Senanayake et al. | |
| 2016/0241579 A1 | 8/2016 | Roosenraad et al. | |
| 2016/0294959 A1* | 10/2016 | Cho | G06Q 50/10 |
| 2016/0306844 A1 | 10/2016 | Frank et al. | |
| 2016/0306974 A1* | 10/2016 | Turgeman | G06Q 20/4016 |
| 2016/0337390 A1 | 11/2016 | Sridhara et al. | |
| 2016/0352760 A1* | 12/2016 | Mrkos | H04L 63/1416 |
| 2017/0010665 A1 | 1/2017 | Tanaka et al. | |
| 2017/0033932 A1 | 2/2017 | Truu et al. | |
| 2017/0041148 A1 | 2/2017 | Pearce | |
| 2017/0085587 A1* | 3/2017 | Turgeman | G06F 3/03547 |
| 2017/0134412 A1 | 5/2017 | Cheng et al. | |
| 2017/0140279 A1* | 5/2017 | Turgeman | G06N 5/04 |
| 2017/0161478 A1 | 6/2017 | Stavrou et al. | |
| 2017/0161503 A1* | 6/2017 | Seigel | G06F 21/577 |
| 2017/0177884 A1* | 6/2017 | Mehta | G06Q 10/06395 |
| 2017/0230417 A1 | 8/2017 | Amar et al. | |
| 2017/0230418 A1 | 8/2017 | Amar et al. | |
| 2017/0243223 A1 | 8/2017 | Kolotinsky et al. | |
| 2017/0257358 A1 | 9/2017 | Ebrahimi et al. | |
| 2017/0279801 A1 | 9/2017 | Andrade | |
| 2017/0286671 A1* | 10/2017 | Chari | G06F 21/552 |
| 2018/0013780 A1* | 1/2018 | Mao | H04L 63/1425 |
| 2018/0039990 A1 | 2/2018 | Lindemann | |
| 2018/0077099 A1* | 3/2018 | Silva | H04L 51/16 |
| 2018/0144110 A1 | 5/2018 | Creamer et al. | |
| 2018/0158165 A1 | 6/2018 | Hodge | |
| 2018/0188916 A1 | 7/2018 | Lyons et al. | |
| 2018/0219914 A1* | 8/2018 | Reith | H04W 12/08 |
| 2018/0241761 A1 | 8/2018 | Bania et al. | |
| 2018/0255080 A1 | 9/2018 | Paine | |
| 2018/0263545 A1* | 9/2018 | Camporesi | H04L 67/12 |
| 2018/0310171 A1 | 10/2018 | Whitaker et al. | |

OTHER PUBLICATIONS

Guy Zyskind et al., Decentralizing Privacy: Using Blockchain to Protect Personal Data, 2015 IEEE CS Security and Privacy Workshops, pp. 180-184, http://inpluslab.sysu.edu.cn/files/Paper/Security/Decentralizing_Privacy_Using_Blockchain_To_Protect_Personal_Data.pdf.

Malek Ben Salem et al., A Survey of Insider Attack Detection Research, Insider Attack and Cyber Security: Beyond the Hacker, Springer, 2008 https://pdfs.semanticscholar.org/3135/eb4b37aa487dd5f06dfa178bbc1d874f3cdf.pdf.

Amos Azaria et al., Behavioral Analysis of Insider Threat: A Survey and Bootstrapped Prediction in Imbalanced Data, Journal of Latex Class Files, vol. 6, No. 1, Jan. 2007.

Mike Hintze et al., Comparing the Benefits of Pseudonymization and Anonymization Under the GDPR, Privacy Analytics, White Paper, 2017.

* cited by examiner

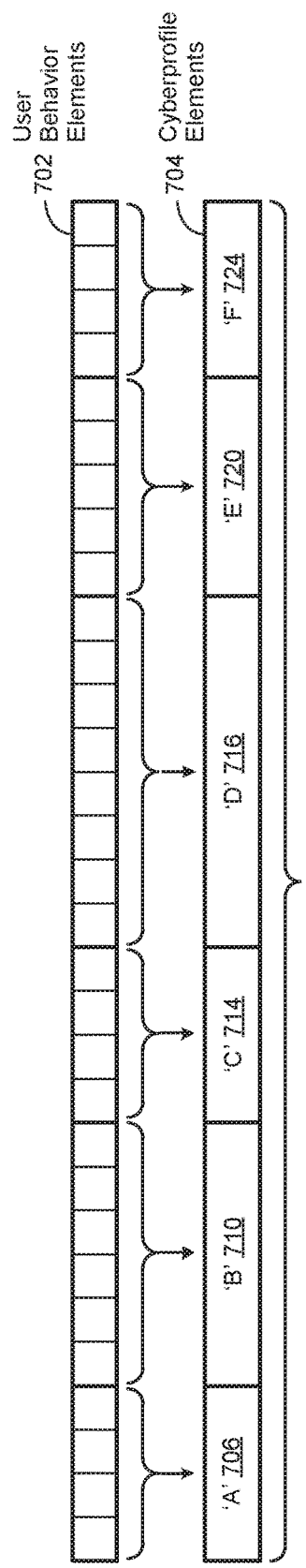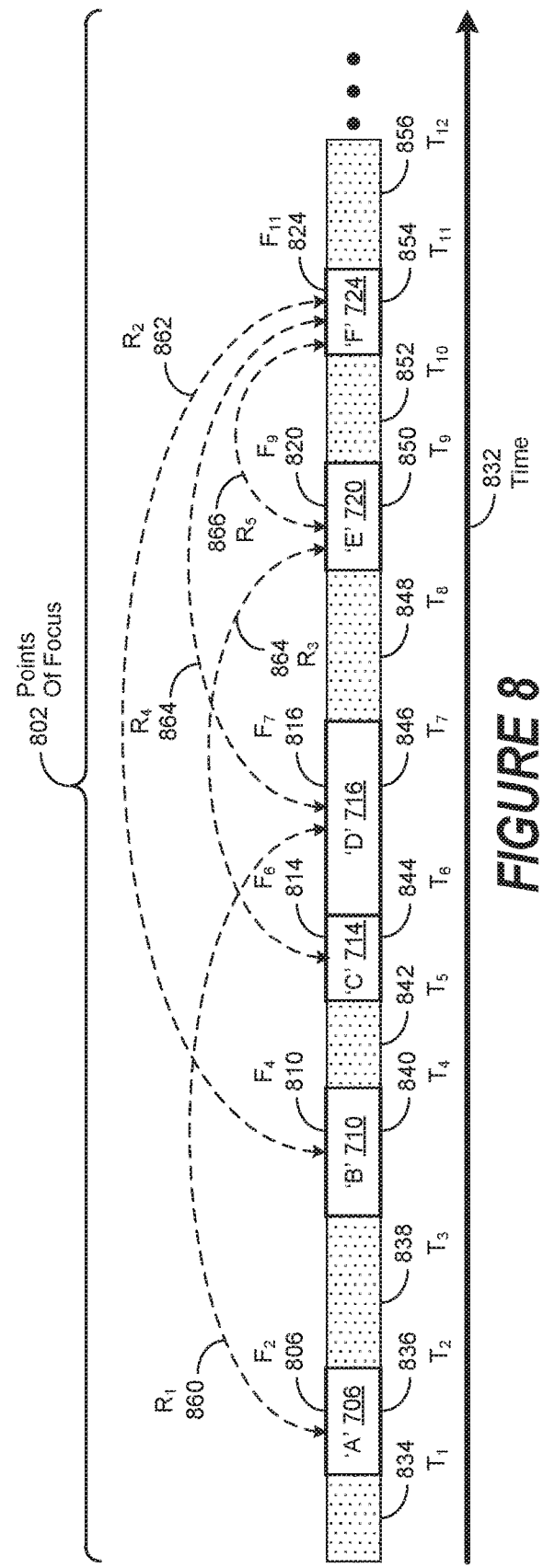
FIGURE 7
FIGURE 8

DISCERNING PSYCHOLOGICAL STATE FROM CORRELATED USER BEHAVIOR AND CONTEXTUAL INFORMATION

BACKGROUND OF THE INVENTION

Field of the Invention

The present invention relates in general to the field of computers and similar technologies, and in particular to software utilized in this field. Still more particularly, it relates to a method, system and computer-usable medium for correlating user behavior and contextual information to discern the psychological state of a user.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Another aspect of security risk is related to the psychological state of a user. As an example, an ordinarily stable user may unwittingly compromise the integrity, availability of confidentiality of a normally secure asset when they are agitated or distraught. As another example, the intent of a malicious user may be inferred by erratic behavior or abnormal mannerisms. Likewise, a normally trusted user may exhibit uncharacteristic behavior when dealing with unfamiliar circumstances, and consequently create unintended risks for an organization.

SUMMARY OF THE INVENTION

A method, system and computer-usable medium are disclosed for correlating user behavior and contextual information to discern the psychological state of a user.

More specifically, a method, system and computer-usable medium are disclosed for performing a psychological profile operation, comprising: monitoring user interactions between a user and an information handling system; converting the user interactions into electronic information representing the user interactions; determining when the user interactions are associated with generation of an electronic communication; associating the user interactions with the electronic communication; and, generating a psychological profile of the user based upon the user interactions and the electronic communication, the psychological profile comprising information regarding a psychological state of the user.

BRIEF DESCRIPTION OF THE DRAWINGS

The present invention may be better understood; and its numerous objects; features and advantages made apparent to those skilled in the art by referencing the accompanying drawings. The use of the same reference number throughout the several figures designates a like or similar element.

FIG. 7 is a simplified block diagram of user behavior elements stored in a cyberprofile;

FIG. 8 is a simplified block diagram of cyberprofile elements corresponding to associated points of focus;

DETAILED DESCRIPTION

Figure 1:
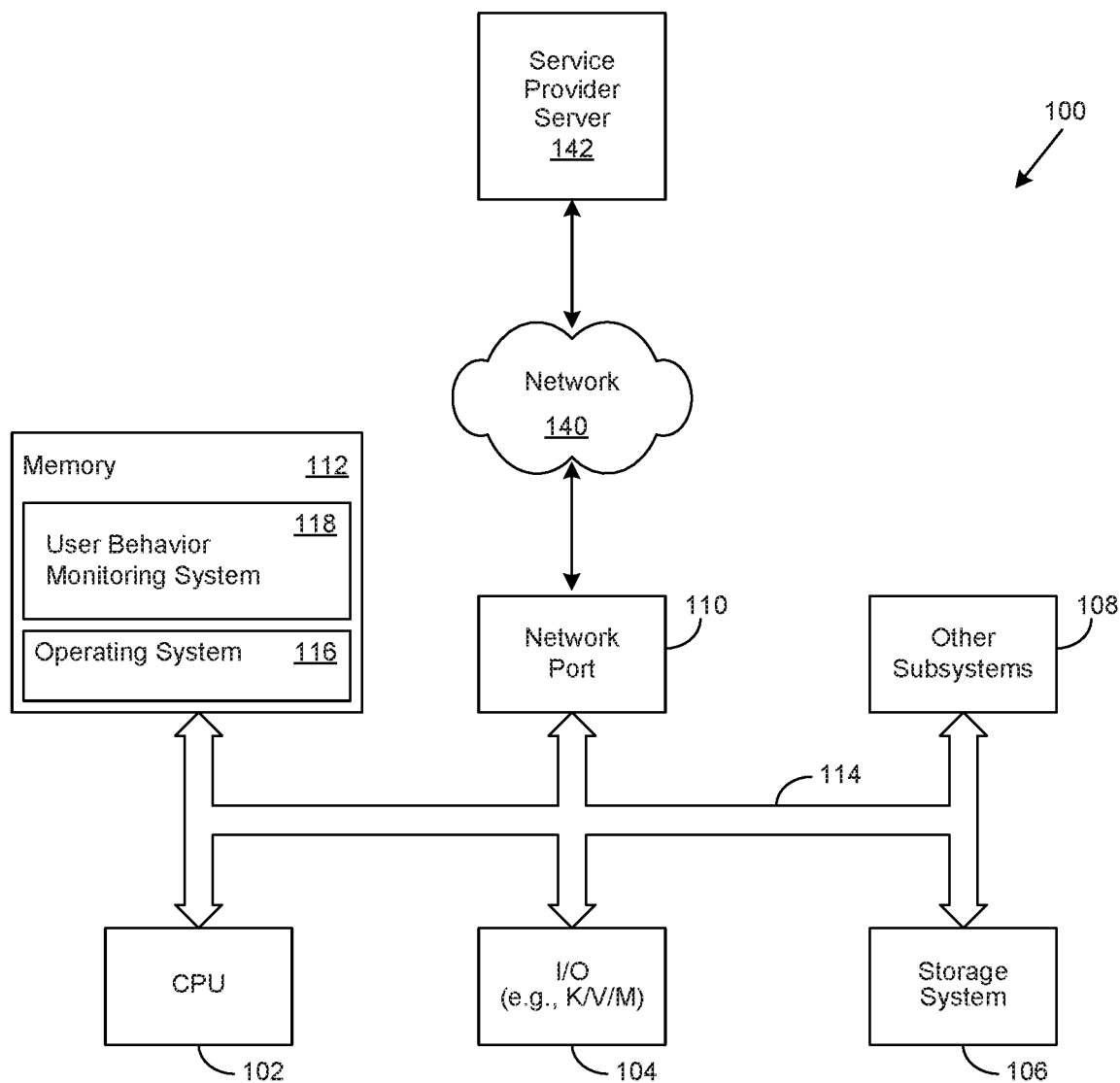
FIG. 1 depicts an exemplary client computer in which the present invention may be implemented.

A method, system and computer-usable medium are disclosed for correlating user behavior and contextual information to discern the psychological state of a user. Various aspects of the invention reflect an appreciation that certain approaches are known that are able to identify individual words, combinations of words, phrases, sentences, or some combination thereof, within an electronic communication that may be related to a psychological state, attitude or characteristic. Likewise, certain aspects of the invention reflect an appreciation that certain key word algorithms are known that are able to process such individual words, combinations of words, phrases, sentences, or some combination thereof, to identify a psychological state, attitude or characteristic. Certain aspects of the invention likewise reflect an appreciation that certain psychological profiling algorithms are known that are able to use such individual words, combinations of words, phrases, sentences, or some combination thereof, to provide an indication of the psychological state of an author of an electronic communication. However, certain aspects of the invention reflect an appreciation that there is currently no know approach to correlating a user's behavior with associated contextual information, as described in greater detail herein, to discern their psychological state of mind at particular point in time.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a user behavior analysis system 118. In one embodiment, the information handling system 100 is able to download the user behavior analysis system 118 from the service provider server 142. In another embodiment, the user behavior analysis system 118 is provided as a service from the service provider server 142.

In various embodiments, the user behavior analysis system 118 performs a user behavior analysis operation to determine a user's psychological state. In certain embodiments, the user behavior analysis operation improves processor efficiency, and thus the efficiency of the information handling system 100, by analyzing a user's behavior to discern their psychological state. As will be appreciated, once the information handling system 100 is configured to perform the user behavior analysis operation, the information handling system 100 becomes a specialized computing device specifically configured to perform user behavior analysis and is not a general purpose computing device. Moreover, the implementation of the user behavior analysis system 118 on the information handling system 100 improves the functionality of the information handling system 100 and provides a useful and concrete result of analyzing a user's behavior to discern their psychological state.

Figure 2:
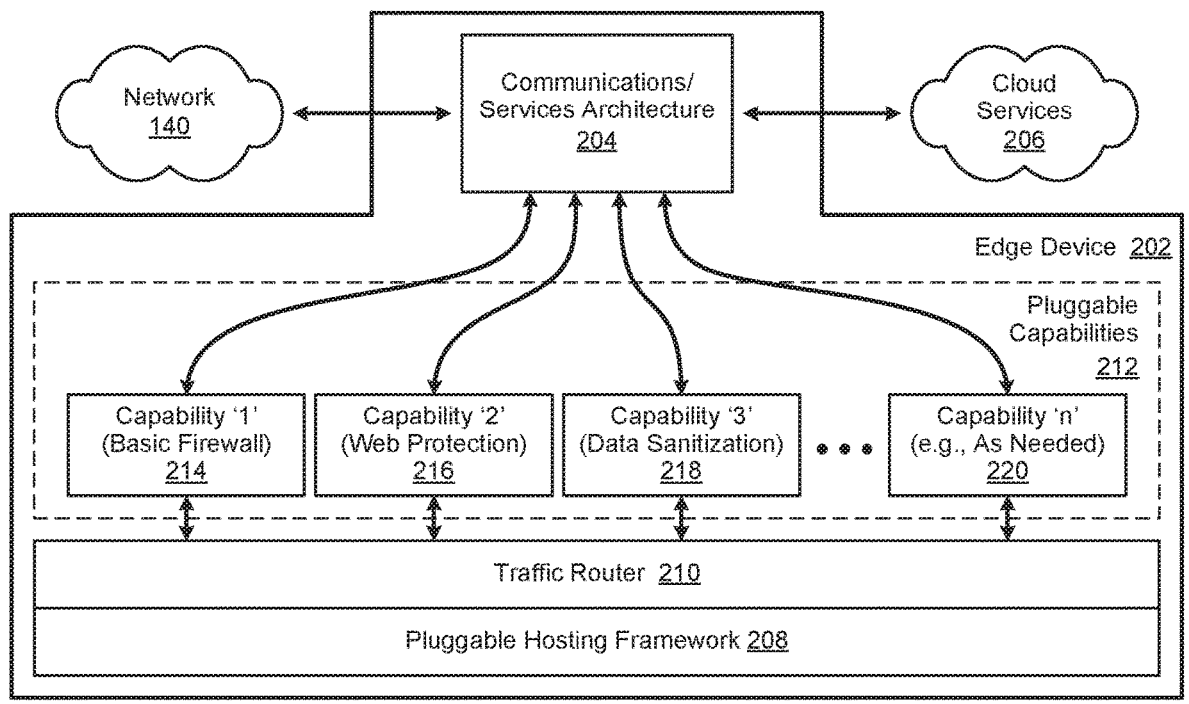
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
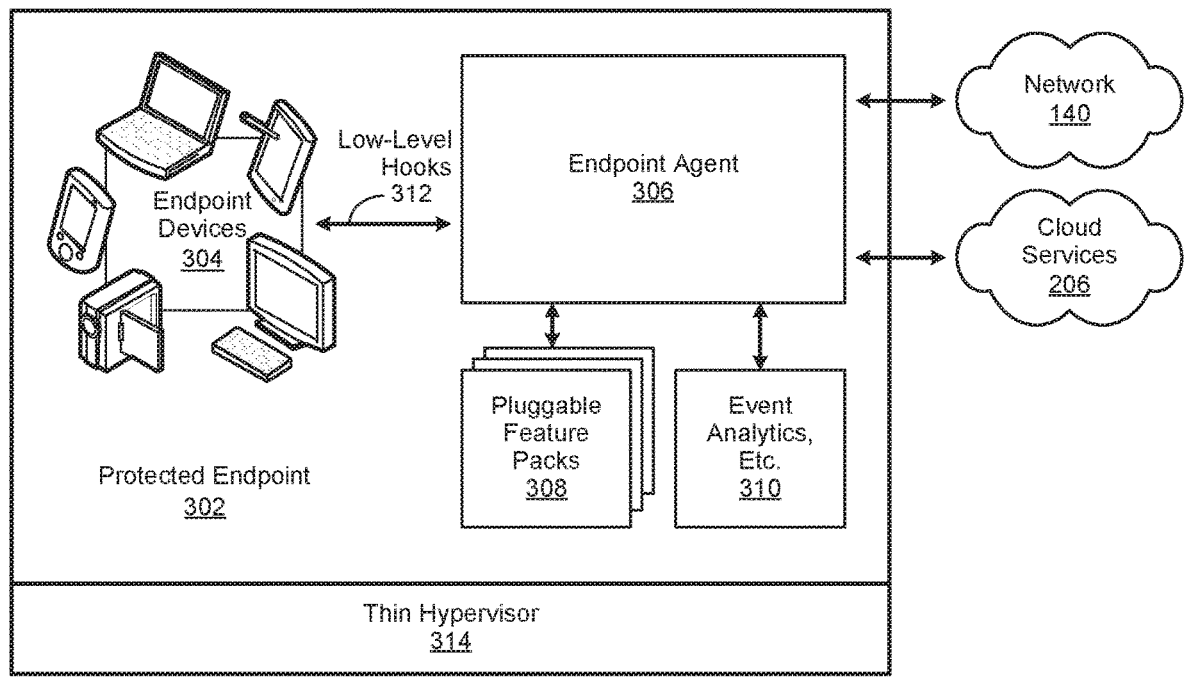
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

As used herein, user behavior broadly refers to an action enacted, or mannerism exhibited, by a user. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations. In certain embodiments, the real-time resolution of the identity of an entity at a particular point in time may be based upon contextual information associated with a given user behavior.

As used herein, contextual information broadly refers to any information, directly or indirectly, individually or in combination, related to a particular user behavior. As described in greater detail herein, the contextual information may include a user's authentication factors. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, an application, data, such as data associated with an application, a resource, or another user. In certain embodiments, user behaviors, and their related contextual information, may be collected at particular points of observation, particular points of focus, particular points in time, or a combination thereof, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-needed basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
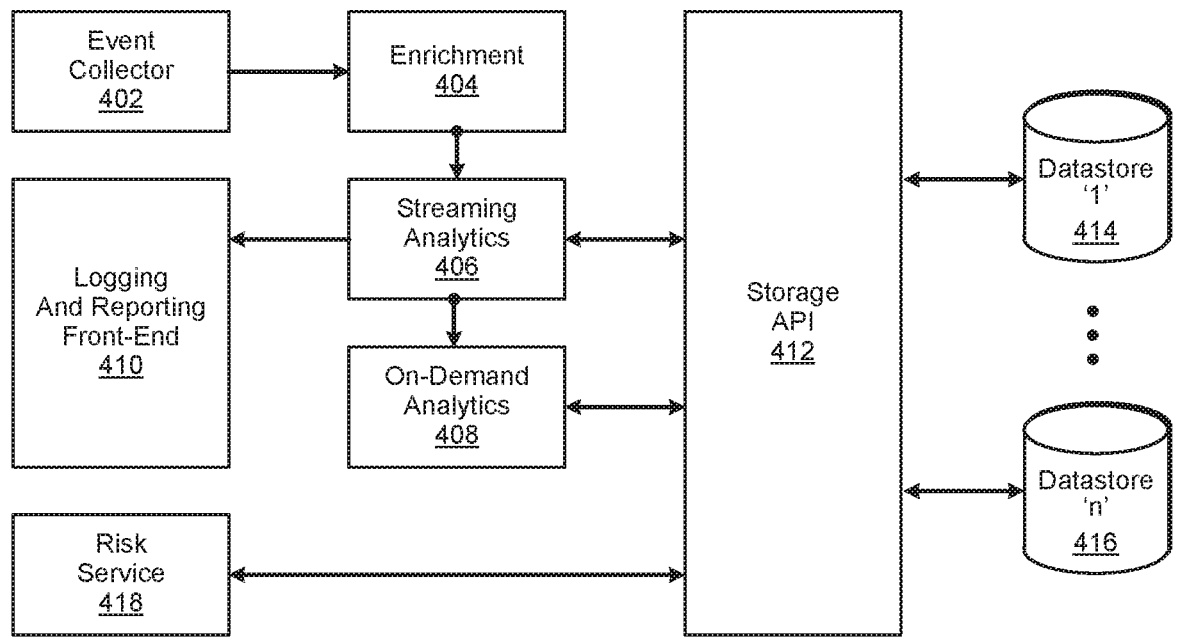
FIG. 4 is a simplified block diagram of a security analytics system.

FIG. 4 is a simplified block diagram of a security analytics system implemented in accordance with an embodiment of the invention. In certain embodiments, the security analytics system shown in FIG. 4 may be implemented to provide log storage, reporting, and analytics capable of performing streaming 406 and on-demand 408 analytics operations. In certain embodiments, such operations may be associated with providing real-time resolution of the identity of an entity at a particular point in time, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular time period or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with providing real-time resolution of the identity of an entity at a particular point in time, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
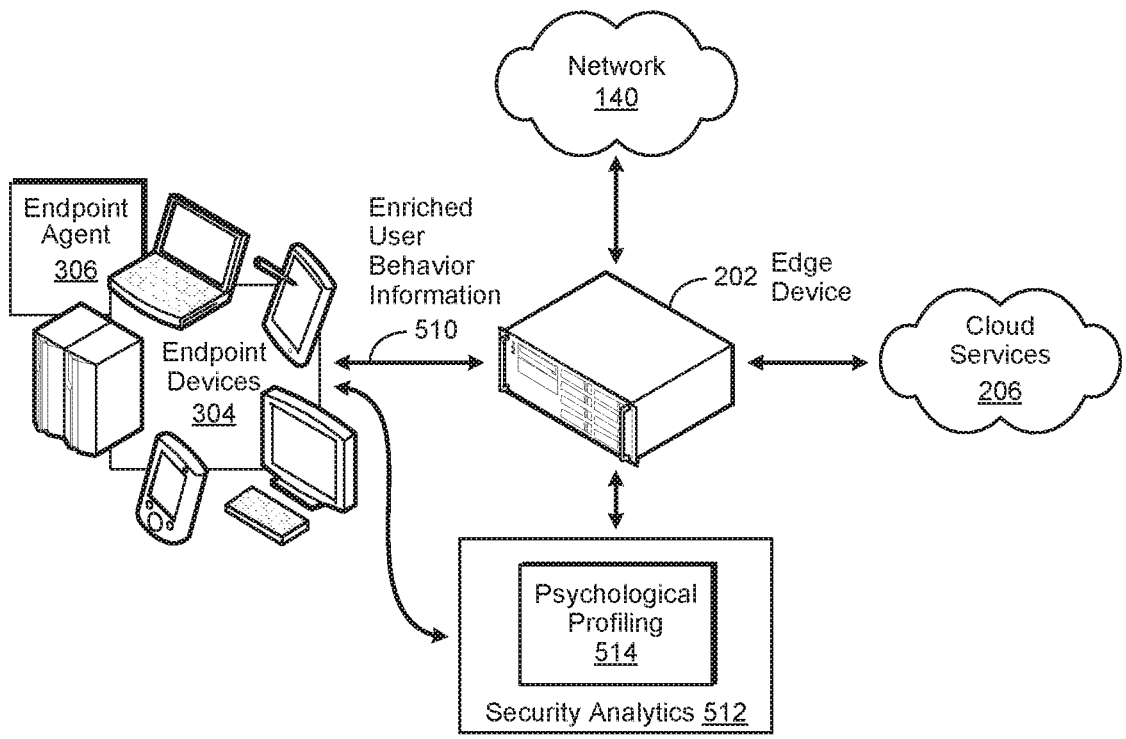
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated with providing real-time resolution of the identity of an entity at a particular point in time. In certain embodiments, the security analytics system 512 may be implemented to perform operations associated with discerning the psychological state of a user from their observed user behavior at a particular point in time. As used herein, psychological state broadly refers to a mental state of mind.

In certain embodiments, the security analytics system 512 may be implemented with a psychological profiling module 514, described in greater detail herein. In certain embodiments the security analytics system 512 may be implemented to use the psychological profiling module 514 to perform the operations associated with discerning the psychological state of a user at a particular point n time. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with managing the use of a blockchain to access a cyberprofile or other sensitive private information (SPI).

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to allow a user behavior analysis system to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, a user behavior analysis system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
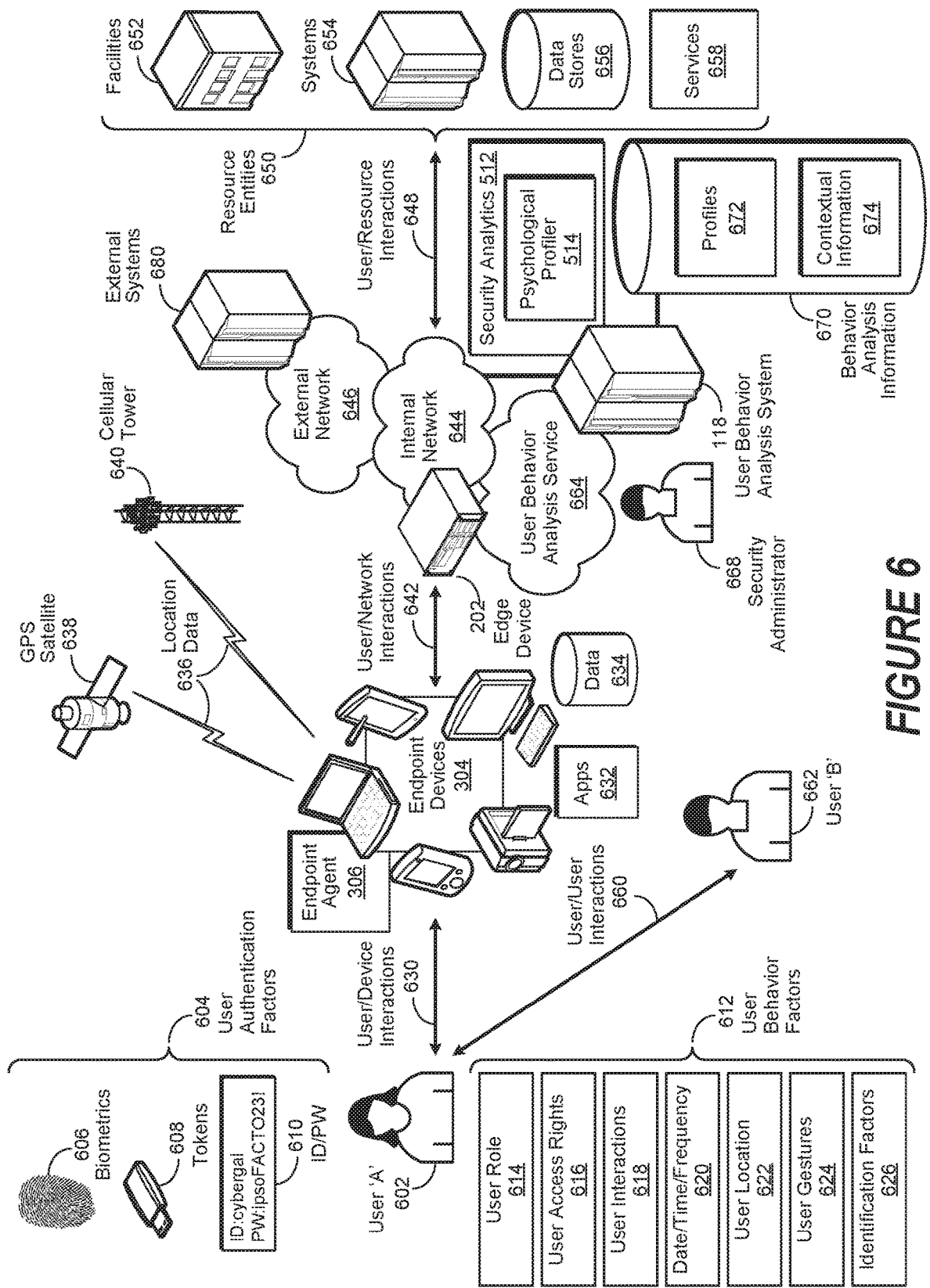
FIG. 6 is a simplified block diagram of the operation of a user behavior analysis system.

FIG. 6 is a simplified block diagram of the operation of a user behavior analysis system implemented in accordance with an embodiment of the invention. In certain embodiments, the user behavior analysis system 118 may be implemented to discern the psychological state of a user by correlating their observed user behavior to certain associated contextual information. In certain embodiments, the user behavior may be stored in the form of a cyberprofile 672.

As used herein, a cyberprofile 672 broadly refers to a collection of information that uniquely distinguishes an entity and their associated behavior within cyberspace. In certain embodiments, the cyberprofile 672 may be stored in a repository of behavior analysis information 670. As likewise used herein, an entity broadly refers to something that exists as itself, whether physically or abstractly. In certain embodiments, an entity may be an individual user, such as user 'A' 602 or 'B' 662, a group, an organization, or a government. In certain embodiments, an entity may likewise be an item, a device, such as endpoint 304 and edge 202 devices, a network, such as an internal 644 and external 646 networks, a domain, an operation, or a process. In certain embodiments, an entity may be a resource 650, such as a geographical location or formation, a physical facility 652, a venue, a system 654, a data store 656, or a service 658, such as a service 658 operating in a cloud environment.

In certain embodiments, the user behavior analysis system 118 may be implemented to process certain entity information associated with providing real-time resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the user behavior analysis system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 604, user behavior factors 612, location data 636, information associated with various endpoint 304 and edge 202 devices, internal 644 and external 646 networks, resource entities 650, or a combination thereof.

In certain embodiments, the user authentication factors 604 may include a user's biometrics 606, an associated security token 608, (e.g., a dongle containing cryptographic keys), or a user identifier/password (ID/PW) 610. In certain embodiments, the user behavior factors 612 may include the user's role 614 (e.g., title, position, responsibilities, etc.), the user's access rights 616, the user's interactions 618, and the date/time/frequency 620 of those interactions 618. In certain embodiments, the user behavior factors 612 may likewise include the user's location 622 when the interactions 618 are enacted, and the gestures 624 used to enact the interactions 618.

In certain embodiments, the user gestures 624 may include key strokes on a keypad, a cursor movement, a mouse movement or click, a finger swipe, tap, or other hand gesture, an eye movement, or some combination thereof. In certain embodiments, the user gestures 624 may likewise include the cadence of the user's keystrokes, the motion, force and duration of a hand or finger gesture, the rapidity and direction of various eye movements, or some combination thereof. In certain embodiments, the user gestures 624 may include various audio or verbal commands performed by the user.

Certain embodiments of the invention reflect an appreciation that the user gestures 624 may provide information related to the psychological state of a user. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention reflect an appreciation that while the user gestures 624 may indicate the psychological state of a user, they may not provide the reason for the user to be in a particular psychological state. In certain embodiments, a user behavior factor 612, such as user gestures 624, may be correlated with certain contextual information, as described in greater detail herein. In certain embodiments, the user behavior factors 612 may be captured as user behavior elements, which as described in greater detail herein, can be processed to generate cyberprofile elements, which in turn can be processed to generate associated cyberprofiles 672.

In certain embodiments, the resulting cyberprofiles 672 may be processed with associated contextual information to generate correlated contextual information 674. In certain embodiments, the correlated contextual information 674 may be stored in a repository of behavior analysis information 670. In certain embodiments, the correlated contextual information 674, along with a user's cyberprofile 672, may be used to perform certain user behavior analysis. In certain embodiments, the user behavior analysis may be performed by the security analytics system 512 shown in FIG. 6. In certain embodiments, the security analytics systems may be implemented with a psychological profiler 514 module. In certain embodiments, the psychological profiler 514 module may be implemented to process a cyberprofile 672 and certain correlated contextual information 674 associated with a user to determine their psychological state at a particular point in time.

In certain embodiments, the cyberprofile 672 may be used with a first set of contextual information 674 to determine the user's psychological state at a first point in time and a second set of contextual information 674 to determine their psychological state at a second point in time. Certain embodiments of the invention reflect an appreciation that such a first and second set of contextual information 674 may be decidedly different, which may provide context for the user's psychological state at different times. Likewise, the first and second set of contextual information 674 may be substantively the same, which may provide an indication that while the user's psychological state may be different at two points in time, the cause of their psychological state may not be related to the contextual information 674 that was collected at the two points in time.

In certain embodiments, the user behavior factors 612 may likewise include personality type information, technical skill level information, financial information, location information, peer information, social network information, or a combination thereof. The user behavior factors 612 may likewise include expense account information, paid time off (PTO) information, data analysis information, personally sensitive information (PSI), personally identifiable information (PII), or a combination thereof. Likewise, the user behavior factors 612 may include insider information, misconfiguration information, third party information, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 304, accessing a system 654, and entering a physical facility 652. Other examples of temporal events include uploading, transferring, downloading, modifying, or deleting data, such as data stored in a datastore 656, or accessing a service 658. Yet other examples of temporal events include interactions between two or more users 660, interactions between a user and a device 630, interactions between a user and a network 642, and interactions between a user and a resource 648, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the user behavior analysis system 118 may be implemented to use information associated with such temporal resolution of an entity's identity to assess the risk associated with a particular entity, at a particular point in time, and adaptively respond with an associated response. In certain embodiments, the user behavior analysis system 118 may be implemented to respond to such assessments in order to reduce operational overhead and improve system efficiency while maintaining security integrity. In certain embodiments, the response to such assessments may be performed by a security administrator 668. Accordingly, certain embodiments of the invention may be directed towards assessing the risk associated with the affirmative resolution of the identity of an entity at a particular point in time in combination with its associated contextual information. Consequently, the user behavior analysis system 118 may be more oriented in various embodiments to risk adaptation than to security administration.

In certain embodiments, a cyberprofile 672 may contain sensitive personal information associated with a particular entity, such as a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Another aspect of SPI is any information associated with a particular individual that is considered confidential. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

Other examples of SPI may include national identification numbers, such as a Social Security Number (SSN) or a passport number, vehicle registration plate and serial numbers, and driver's license numbers. Additional examples of SPI may include user identifiers and passwords 610, email addresses, social media identifiers, credit and debit card numbers, personal identification numbers (PINs), and other digital identity information. Yet other examples of SPI may include biometrics 606, user access rights 616, personality type information, various financial information, such as credit scores, personal correspondence, and other confidential information. Skilled practitioners of the art will recognize that many such examples of SPI are possible. Accordingly, the foregoing is not intended to limit the spirit, scope, or intent of the invention.

Those of skill in the art will likewise be aware that it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as a particular external system 680. Defenses against such approaches include encrypting the data stream prior to being communicated across a network, such as the internal 644 or external 646 networks shown in FIG. 6.

However, other approaches, such as the use of a key logger, may surreptitiously capture the user's keystrokes or user gestures 624 and communicate the resulting data stream in their native form to a hacker or other infiltrator. Another issue is the possibility that a normally-trusted insider, such as a security administrator 668, may have access to a decrypted data stream as part of their day-to-day responsibilities. As an example, a security administrator 668 may be using a security analytics 512 system to perform a threat analysis related to a particular user. In the process, they may be exposed to various SPI associated with the user, such as certain user IDs and passwords 610. It will be appreciated that such exposure creates the opportunity for a security breach, whether intended or not. Another approach is to impersonate a legitimate website. In such approaches, the user may navigate to the site and innocently enter their passwords, only to have them captured for later use in illegal activities.

In certain embodiments, the user behavior analysis system 118 may be implemented to use information associated with certain user behavior elements to resolve the identity of an entity at a particular point in time. In certain embodiments, the user behavior analysis system 118 may be implemented to use information associated with certain user behavior elements to discern a user's psychological state at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 630 interaction, a user/network 642 interaction, a user/resource 648 interaction, a user/user 660 interaction, or combination thereof.

As an example, user 'A' 602 may use an endpoint device 304 to browse a particular web page on a news site on the Internet. In this example, the individual actions performed by user 'A' 602 to access the web page are user behavior elements that constitute a user behavior. As another example, user 'A' 602 may use an endpoint device 304 to download a data file from a particular system 654. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 662, and an endpoint device 304.

In certain embodiments, the user/device 630 interaction may include interaction with an endpoint device 304 that is not connected to a network at the time the interaction occurs. As an example, user 'A' 602 or 'B' 662 may interact with an endpoint device 304 that is offline, using applications 632, accessing data 634, or a combination thereof, it may contain. Those user/device 630 interactions, or their result, may be stored on the endpoint device 304 and then be accessed or retrieved at a later time once the endpoint device 304 is connected to the internal 644 or external 646 networks.

In certain embodiments, the endpoint device 304 may be used to communicate data through the use of an internal network 644, an external network 646, or a combination thereof. In certain embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 648 interactions may include interactions with various resources 650. In certain embodiments, the resources 650 may include various facilities 652 and systems 654, either of which may be physical or virtual, as well as data stores 656 and services 658. In certain embodiments, the user/user 660 interactions may include interactions between two or more users, such as user 'A' 602 and 'B' 662. In certain embodiments, the user/user interactions 660 may be physical, such as a face-to-face meeting, via a user/device 630 interaction, a user/network 642 interaction, a user/resource 648 interaction, or some combination thereof.

In certain embodiments, the user/user 660 interaction may include a face-to-face verbal exchange between two users. In certain embodiments, the user/user 660 interaction may include a written exchange, such as text written on a sheet of paper, between two users. In certain embodiments, the user/user 660 interaction may include a face-to-face exchange of gestures, such as a sign language exchange, between two users. In certain embodiments, temporal event information associated with various interactions 630, 642, 648, 660 may be collected and used to provide real-time resolution of the identity of an entity at a particular point in time. Those of skill in the art will recognize that many such examples of user/device 630, user/network 642, user/resource 648, and user/user 660 interactions are possible. Accordingly, the foregoing is not intended to limit the spirit, scope or intent of the invention.

In certain embodiments, the user behavior analysis system 118 may be implemented to process certain contextual information to ascertain the identity of an entity at a particular point in time. In certain embodiments, the user behavior analysis system 118 may be implemented to process certain contextual information to ascertain the psychological state of a user at a particular point in time. In certain embodiments, the contextual information may include location data 636. In certain embodiments, the endpoint device 304 may be configured to receive such location data 636, which is used as a data source for determining the user's location 622.

In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint 304 or edge 202 device. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 652 or system 654. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the user behavior analysis system 118 may be implemented as a stand-alone system. In certain embodiments, the user behavior analysis system 118 may be implemented as a distributed system. In certain embodiment, the user behavior analysis system 118 may be implemented as a virtual system, such as an instantiation of one or more virtual machines (VMs). In certain embodiments, the user behavior analysis system 118 may be implemented as a user behavior monitoring service 664. In certain embodiments, the user behavior monitoring service 664 may be implemented in a cloud environment familiar to those of skill in the art. Those of skill in the art will recognize that many such embodiments are possible. Accordingly, the foregoing is not intended to limit the spirit, scope or intent of the invention.

FIG. 7 is a simplified block diagram of user behavior elements stored in a cyberprofile implemented in accordance with an embodiment of the invention. In certain embodiments, groups of user behavior elements 702, described in greater detail herein, may be combined to generate one or more associated cyberprofile elements 704. As used herein, a cyberprofile element 704 broadly refers to a collection of cyberprofile information, which in certain embodiments may include entity information, entity identifier information, behavior element information, temporal information, contextual information, or combination thereof, as described in greater detail herein.

In certain embodiments, the resulting cyberprofile elements 704 may in turn be combined to generate a cyberprofile 718. As an example, various associated user behavior elements 702 may be grouped to generate cyberprofile elements 'A' 706, 'B' 710, 'C' 714, 'D' 716, 'E' 720, and 'F' 724. The resulting cyberprofile elements 704 are then combined to generate an associated cyberprofile 718. In these embodiments, the method by which certain cyberprofile elements 704 are selected to be combined to generate an associated cyberprofile 718, and the method by which they are combined, is a matter of design choice.

In certain embodiments, the cyberprofile 706 may be implemented to contain cyberprofile information not contained in the user behavior elements 702. In certain embodiments, data associated with a given cyberprofile 718 may be used in the performance of user behavior analysis operations to detect acceptable, anomalous, malicious and unknown behavior enacted by a user. In certain embodiments, data associated with a given cyberprofile 718 may be used in the performance of user behavior analysis operations to discern the psychological state of a user by correlating their user behavior to certain associated contextual information. In certain embodiments, data associated with a given cyberprofile 718 may be used in the performance of user behavior analysis operations to discern the psychological state of a user at a particular point in time. Those of skill in the art will recognize that many such embodiments are possible. Accordingly, the foregoing is not intended to limit the spirit, scope or intent of the invention.

FIG. 8 is a simplified block diagram of cyberprofile elements corresponding to associated points of focus. As used herein, focus broadly refers to an indication of a particular component of a user interface (UI) selected to receive input or provide output. In certain embodiments, the UI may be a keyboard, a mouse or other pointer device, a touch-sensitive or video display screen, a microphone, a speaker or earphone, a hardware port or other interface, a still or video camera, a fingerprint or other type of scanner, a card reader, or other electronic device familiar to those of skill in the art capable of receiving input, providing output, or a combination thereof. In certain embodiments, the UI may include a graphical user interface (GUI) familiar to skilled practitioners of the art. In certain embodiments, information associated with a particular instance of focus may be provided by an endpoint agent, described in greater detail herein.

In certain embodiments, focus is provided as contextual information, described in greater detail herein. In certain embodiments, the contextual information may likewise include information related to the provision or receipt of certain content occurring at a particular point of focus 802. As likewise used herein, a point of focus 802 broadly refers to a correlation between a particular instance of a focus and an associated cyberprofile element. As an example, as shown in FIG. 8, points of focus $F_2$ 806, $F_4$ 810, $F_6$ 814, $F_7$ 816, $F_9$ 820, and $F_{11}$ 824 respectively correspond to cyberprofile elements 'A' 706, 'B' 710, 'C' 714, 'D' 716, 'E' 720, and 'F' 724. In certain embodiments, focus is moved from one UI component at a first time 832 interval to another UI component at a second time 832 interval. To continue the prior example, points of focus $F_2$ 806, $F_4$ 810, $F_6$ 814, $F_7$ 816, $F_9$ 820, and $F_{11}$ 824 may respectively be associated with time intervals $T_2$ 836, $T_4$ 840, $T_6$ 844, $T_7$ 846, $T_9$ 850, and $T_{11}$ 854.

In certain embodiments, various points of focus 802 may be separated by a time 832 interval of certain duration when there is no active point of focus 802. As shown in FIG. 8, point of focus $F_2$ 806 may be preceded by time interval $T_1$ 834 and separated from point of focus $F_4$ 810 by time interval $T_3$ 838. Likewise, points of focus $F_4$ 816, $F_7$ 816 and $F_9$ 820 may be respectively separated from points of focus $F_6$ 814, $F_9$ 820 and $F_{11}$ 824 by time intervals $T_5$ 842, $T_8$ 848 and $T_{10}$ 852, with time interval $T_{12}$ 856 following point of focus $F_{11}$ 856.

In certain embodiments, various points of focus 802 may related. As an example, point of focus $F_2$ 806 during time interval $T_2$ 836 may be related to using an endpoint device to compose a document, which is intended to be attached to an email to a colleague. However, the composition of the document is not completed during time interval $T_2$ 836 and is subsequently stored for completion at a later time. In the interim, time interval $T_3$ 836 ensues, with no associated point of focus 802, followed by point of focus $P_4$ 816 during time interval $T_4$ 840, at which time the email to the colleague is initiated, yet not completed. Like the uncompleted document, it is stored for completion at a later time.

Meanwhile, time interval $T_3$ 836 ensues, with no associated point of focus 802, followed by point of focus $F_6$ 814 during time interval $T_6$ 844, at which time a spreadsheet is initiated, also intended to be attached to the email to the colleague. However, like the email and the document before, it is not completed and stored for completion at a later time. Thereafter, point of focus $F_6$ 814 shifts to point of focus $F_7$ 816 during time interval $T_7$ 846, at which time the document is completed, after which it is stored for eventual attachment to the email to the colleague. As shown in FIG. 8, the relationship between point of focus $F_2$ 806 and $F_7$ 816, which respectively represent the initiation and completion of the document, is in turn represented by relationship $R_1$ 860.

Time interval $T_8$ 848 then ensues, during which there is no associated point of focus 802, followed by point of focus $F_9$ 820 during time interval $T_9$ 850, at which time the spreadsheet is completed, after which it is likewise stored for eventual attachment to the email to the colleague. As shown in FIG. 8, the relationship between point of focus $F_6$ 814 and $F_9$ 820, which respectively represent the initiation and completion of the spreadsheet, is in turn represented by relationship $R_3$ 864. Time interval $T_{10}$ 852 then ensues, during which there is no associated point of focus 802, followed by the point of focus 802 shifting to $F_{11}$ 824 during time interval $T_{11}$ 854.

As also shown in FIG. 8, the relationship between point of focus $F_4$ 810 and $F_{11}$ 824, which respectively represent the initiation and completion of the email, is in turn represented by relationship $R_2$ 862. Likewise, relationships $R_4$ 864 and $R_5$ 866 respectively represent the relationships between points of focus $F_7$ 816 and $F_9$ 820 with point of focus $F_{11}$ 824, signifying the document and the spreadsheet have been attached to the email and it has been sent. Thereafter, time interval $T_{12}$ 856 ensues, during which there is no associated point of focus 802.

Figure 9:
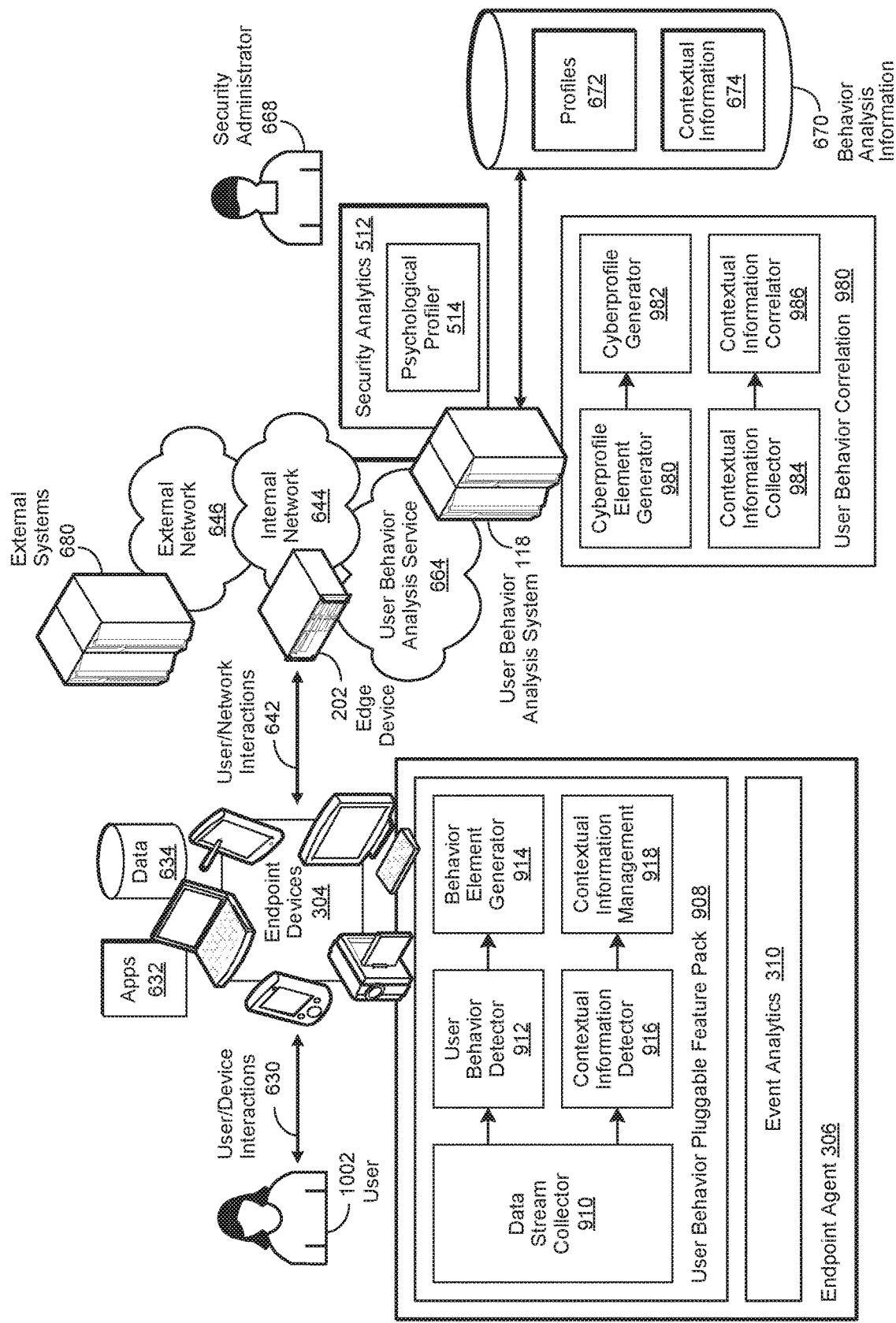
FIG. 9 is a simplified block diagram of the operation of user behavior correlation module to correlate user behavior to associated contextual information.

FIG. 9 is a simplified block diagram of the operation of user behavior correlation module implemented in an embodiment of the invention to correlate user behavior to associated contextual information. In certain embodiments, the user behavior may be monitored during user/device interactions 630 between the user 1002 and an endpoint device 304. In certain embodiments, as described in greater detail herein, an endpoint agent 306 may be implemented on the endpoint device 304 to perform the user behavior monitoring. In certain embodiments, the endpoint agent 306 may be implemented to include an event analytics 310 module and a user behavior pluggable feature pack 908. In certain embodiments, the user behavior pluggable feature pack 908 may be further implemented to include a data stream collector 910 module, a user behavior detector 912 module, a user behavior element 914 module, a contextual information detector 916 module, and a contextual information management 918 module.

In certain embodiments, the data stream collector 910 module may be implemented to capture data streams resulting from user/device interactions 630 between a user 1002 and a corresponding endpoint device 304. In certain embodiments, the data stream collector 910 module may be implemented to capture data streams resulting from user/network interactions 642 between an endpoint device 304 and an edge device 202. In certain embodiments, certain user/network interactions 642 may be associated with certain user/device interactions 630.

In certain embodiments, the user behavior detector 912 module may be implemented to identify various user behavior data in the resulting data streams, which may then be extracted and provided to the user behavior element generator 914 module. In certain embodiments, the user behavior element management 914 module may be implemented to process the extracted user behavior data to generate associated user behavior elements, described in greater detail herein. In certain embodiments, the resulting user behavior elements may be generated in a form that is conducive to being correlated to associated contextual information.

In certain embodiments, the data streams may include certain contextual information, including information related to points of focus, described in greater detail herein, associated with user 1002 interaction with various applications 632 and data 634 residing on an endpoint device. As an example, the contextual data may include certain kinds of content. In certain embodiments, such content may include text, unstructured data, structured data, graphical images, photographs, audio recordings, video recordings, biometric information, and so forth. In certain embodiments, the content may include metadata of various kinds familiar to skilled practitioners of the art.

In certain embodiments, the contextual information detector 916 may be implemented to detect such contextual data in the data streams collected by the data stream collector module. In certain embodiments, the contextual information detector 916 may be implemented to provide detected contextual information to the contextual information management 918 module for processing. In certain embodiments, the contextual information management 918 may be implemented to process the detected contextual information to generate associated contextual information elements.

In certain embodiments, the resulting contextual information elements may be generated in a form that is conducive to being correlated to associated behavior elements. In certain embodiments, the correlation of the user behavior elements generated by the user behavior element generator 814 module and the contextual information elements generated by the contextual information management 918 module may be related to establishing one or more points of focus, described in greater detail herein. In certain embodiments, the resulting user behavior elements and contextual information elements may be provided to the user behavior analysis system 118 by the endpoint agent 306. In certain embodiments, the endpoint agent 306 may be implemented to provide certain associated event analytics information generated by the event analytics 310 module to the user behavior analysis system 118 in combination with the resulting user behavior elements and contextual information elements.

In certain embodiments, user behavior elements and contextual information elements received by the user behavior analysis system 118 may be provided to the user behavior correlation system 980 for processing. In certain embodiments, the user behavior correlation 980 system may include a cyberprofile element generator 980 module, a cyberprofile generator 982 module, a contextual information collector 984 module, and a contextual information correlator 986 module.

In certain embodiments, the user behavior elements provided by the user behavior analysis system 118 may be received by the cyberprofile element generator 980 module, where they are processed generate cyberprofile elements, described in greater detail herein. In certain embodiments, the resulting cyberprofile elements may then be provided to the cyberprofile generator 982 module where they are processed to generate one or more cyberprofiles 672, likewise described in greater detail herein. In certain embodiments, the resulting cyberprofiles 672 may be stored in a repository of behavior analysis information 670.

In certain embodiments, the contextual information elements provided by the user behavior analysis system 118 may be received by the contextual information collector 984, which in turn may provide them to the contextual information correlator 986 module, where they are correlated to their associated cyber profiles 672. In certain embodiments the correlated contextual information elements 674 are stored in the repository of behavior analysis information 670. In certain embodiments, the contextual information elements 674 and their associated cyberprofiles 672 are correlated to represent points of focus, and their respective interrelationships, described in greater detail herein.

In various embodiments, certain correlated contextual information elements 674, and their associated user profiles 672, are provided to a security analytics 512 analysis system, described in greater detail herein, where they are used to determine the psychological state of a user 1002 at a particular point in time. In certain embodiments, the security analytics system 512 may be implemented with a psychological profiler module 514. In certain embodiments, the psychological profiler module 514 may be configured to use the correlated contextual information 674, and user behavior information included in associated cyber profiles 672, to determine the psychological state of a user 1002 at a particular point in time.

In certain embodiments, the psychological state of a user 1002 at a particular point in time may represent a security threat. In certain embodiments, the security analytics system 512 may be implemented to generate and provide a notification related to such a threat. In certain embodiments, the notification of a potential security threat may result in a remedial action. In certain embodiments, the remedial action may be performed automatically by the user behavior system 118, the security analytics system 512, or combination thereof. In certain embodiments, the remedial action may be performed manually by a security administrator 668. Those of skill in the art will recognize that many such embodiments are possible. Accordingly, the foregoing is not intended to limit the spirit scope or intent of the invention.

Figure 10:
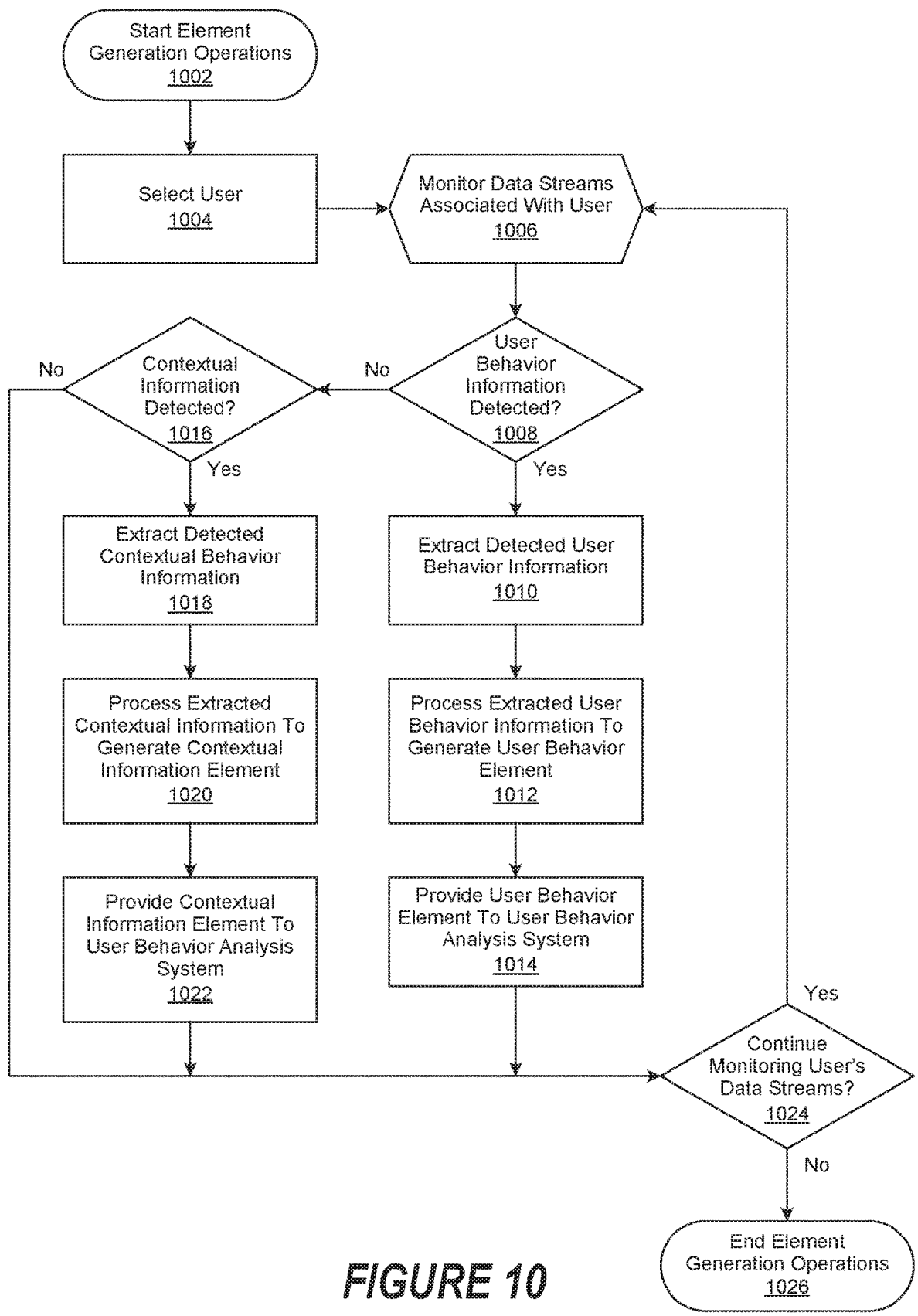
FIG. 10 is a generalized flowchart of the performance of user behavior and contextual information element generation operations.

FIG. 10 is a generalized flowchart of the performance of user behavior and contextual information element generation operations implemented in accordance with an embodiment of the invention. In this embodiment, user behavior and contextual information element generation operations are begun in step 1002, followed by the selection of a user in step 1004. Ongoing operations are then performed in step 1006 to monitor data streams associated with the user. In certain embodiments, the selection of which data streams to monitor is a matter of design choice.

A determination is then made in step 1008 whether user behavior information has been detected in the monitored data streams. If so, then the detected user behavior information is extracted in step 1010 and then processed in step 1012 to generate a user behavior element, described in greater detail herein. Once the user behavior element has been generated in step 1012, it is provided to a user behavior analysis system in step 1014 for further processing, as likewise described in greater detail herein. A determination is then made in step 1024 whether to continue monitoring data streams associated with the user. If so, the process is continued, proceeding with step 1006. Otherwise, user behavior and contextual information element generation operations are ended in step 1026.

However, if it was determined in step 1008 that no user behavior information was detected, then a determination is made in step 1016 whether contextual information has been detected in the monitored data stream. If so, then the detected contextual information is extracted in step 1018 and then processed in step 1020 to generate a contextual information element, described in greater detail herein. Once the contextual information element has been generated in step 1020, it is provided to the user behavior analysis system in step 1022 for further processing, as likewise described in greater detail herein. However, if it was determined in step 1016 that contextual information was not detected in the monitored data streams, then the process is continued, proceeding with step 1024.

Figure 11A:
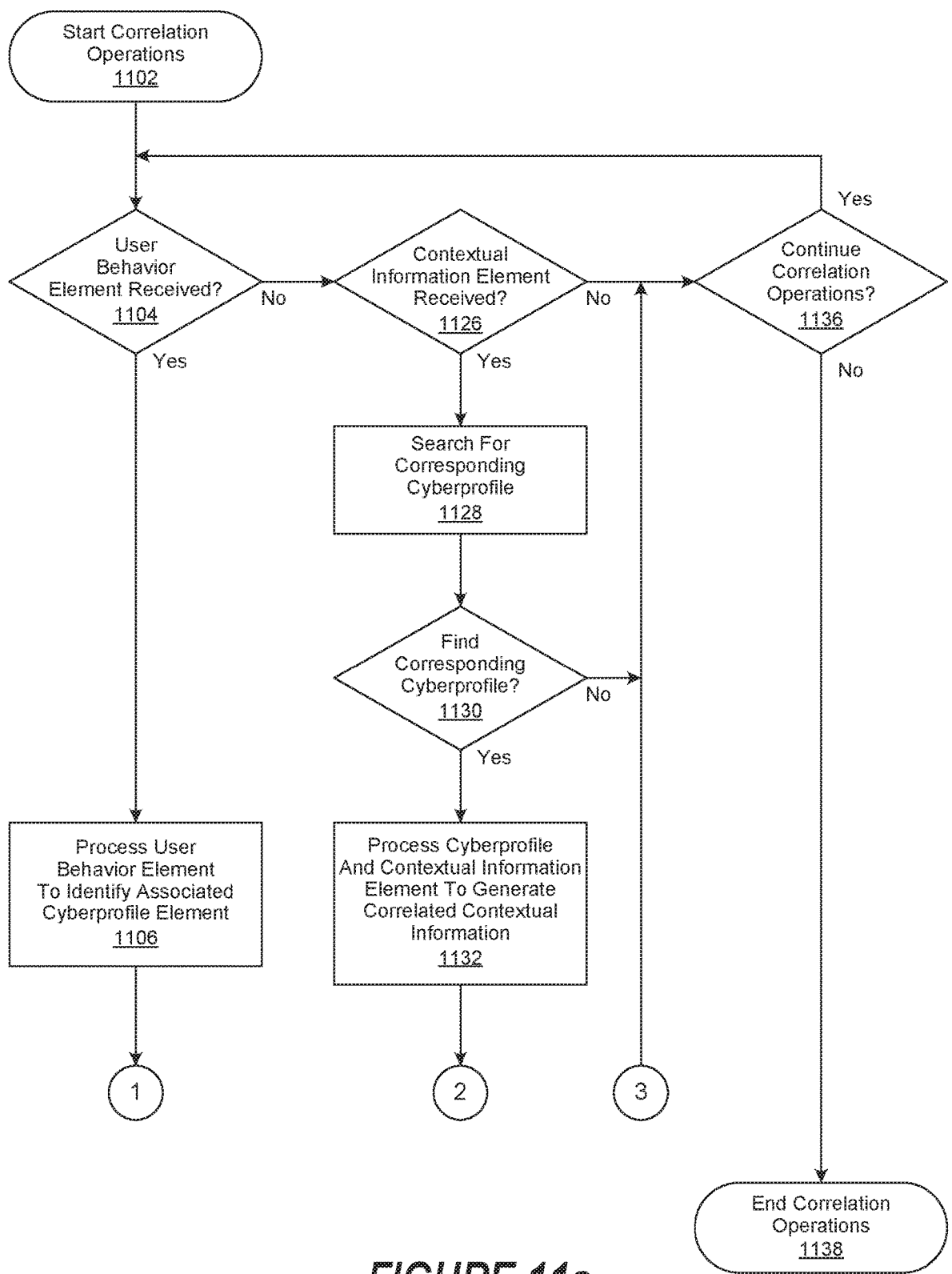
FIGS. 11a and 11b are a generalized flowchart of the performance of contextual information element and cyberprofile correlation operations.
Figure 11B:
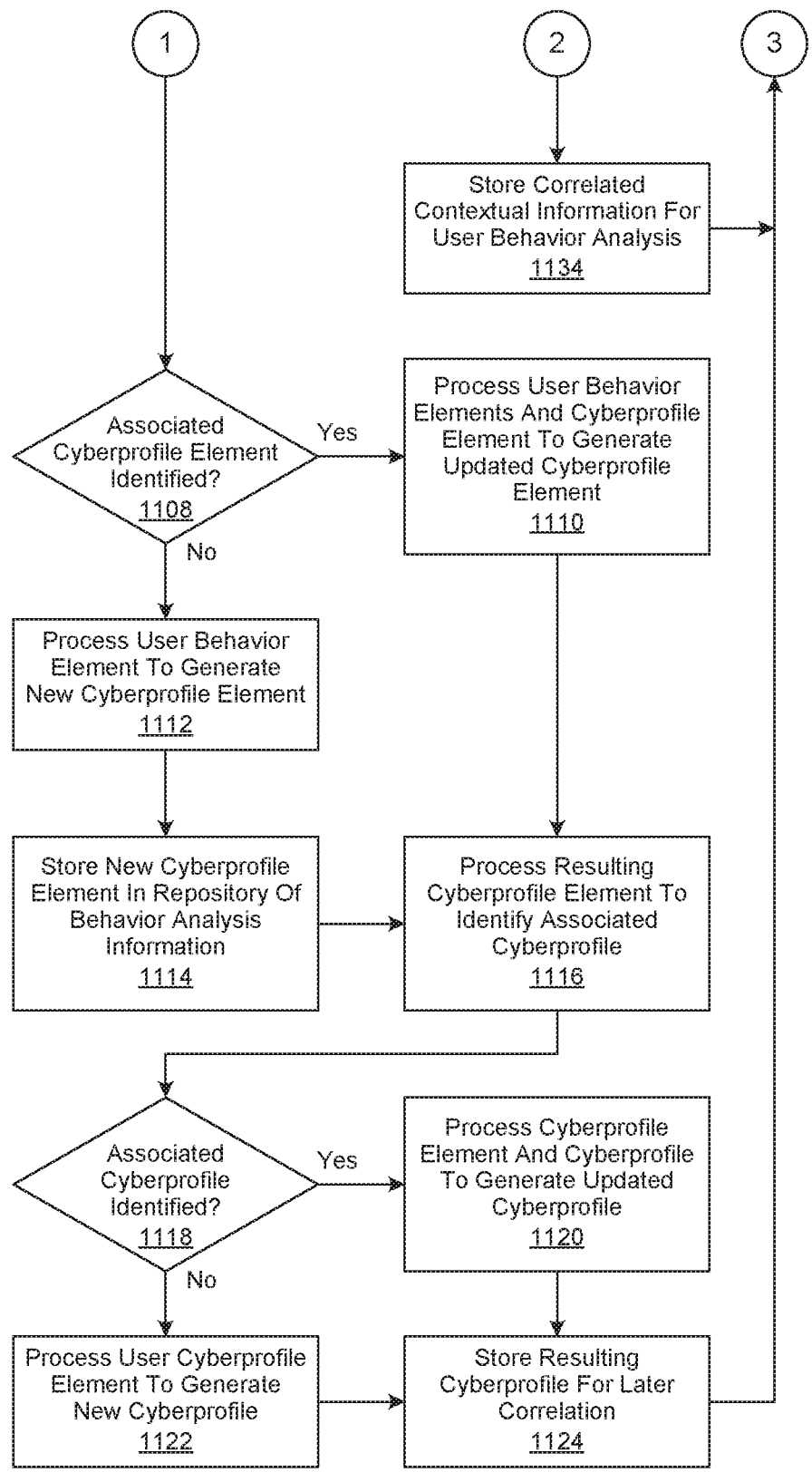

FIGS. 11*a* and 11*b* are a generalized flowchart of the performance of contextual information element and cyberprofile correlation operations implemented in accordance with an embodiment of the invention. In this embodiment, contextual information element and cyberprofile correlation operations are begun in step 1102, followed by a determination being made in step 1104 whether a user behavior analysis system, described in greater detail herein, has received a user behavior element. If so, then the user behavior element is processed in step 1106 to identify an associated cyberprofile element in a repository of behavior analysis information.

A determination is then made in step 1108 whether an associated cyberprofile element was identified. If so, then the user behavior element is processed with the identified cyberprofile element in step 1110 to generate an updated cyberprofile element. Otherwise, the user behavior element is processed in step 1112 to generate a new cyberprofile element, which is then stored in the repository of behavior analysis information in step 1114. Thereafter, or once the updated cyberprofile element has been generated in step 1110, the resulting cyberprofile element is processed in step 1116 to identify an associated cyberprofile in the repository of behavior analysis information.

A determination is then made in step 1118 whether an associated cyberprofile was identified. If so, then the cyberprofile element is processed with the identified cyberprofile in step 1120 to generate an updated cyberprofile. Otherwise, the cyberprofile element is processed in step 1122 to generate a new cyberprofile. Thereafter, or once the updated cyberprofile has been generated in step 1120, the resulting cyberprofile is stored in the repository of behavior analysis information in step 1124 for later correlation.

However, if it was determined in step 1104 that a user behavior element was not received from the user behavior analysis system, then a determination is made in step 1126 whether a contextual information element was received. If so, the repository of behavior analysis information is searched in step 1128 to identify a corresponding cyberprofile. A determination is then made in step 1130 whether a corresponding cyberprofile was identified. If not, or if it was determined in step 1126 that a contextual information element was not received, then a determination is made in step 1136 whether to continue the performance of contextual information element and cyberprofile correlation operations. If so, the process is continued, proceeding with step 1104. Otherwise, the performance of contextual information element and cyberprofile correlation operations is ended in step 1138.

However, if it was determined in step 1130 that a corresponding cyberprofile was identified, then it is processed with the contextual information element in step 1132 to generate correlated contextual information, described in greater detail herein. The resulting correlated contextual information is then stored in the repository of behavior analysis information in step 1134 for later user in user behavior analysis operations, likewise described in greater detail herein. Thereafter, or after the cyberprofile has been stored in the repository of behavior analysis information in step 1124, the process is continued, proceeding with step 1136.

Figure 12:
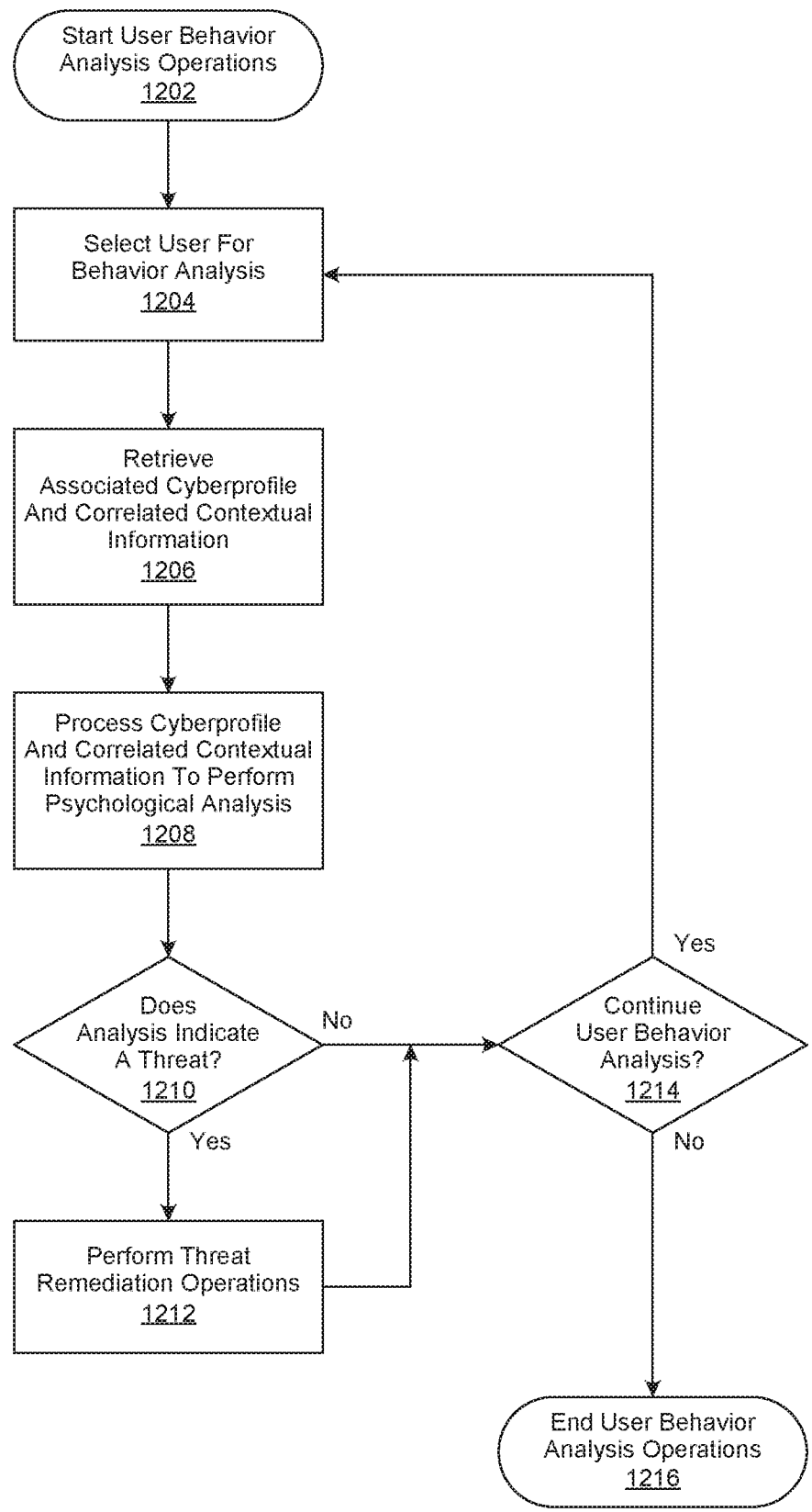
FIG. 12 is a generalized flowchart of the performance of user behavior analysis operations.

FIG. 12 is a generalized flowchart of the performance of user behavior analysis operations implemented in accordance with an embodiment of the invention. In this embodiment, user behavior analysis operations are begun in step 1202, followed by the selection of a user in step 1204 for the performance of associated user behavior analysis operations. Associated cyberprofile and correlated contextual information, described in greater detail herein, is then retrieved from a repository of behavior analysis information in step 1206.

The retrieved cyberprofile and correlated contextual information is then processed in step 1208 to perform a psychological analysis of the user. In certain embodiments, the results of the psychological analysis may be used to determine the psychological state of the user, as described in greater detail herein. A determination is then made in step 1210 whether the psychological analysis of the user indicates a threat, such as a security threat. If so, then threat remediation operations are performed in step 1212. In certain embodiments, the selection of which threat remediation operations are performed, and the method by which they are performed, is a matter of design choice.

Once the threat remediation operations have been performed in step 1212, or if it was determined in step 12010 that the psychological analysis of the user did not indicate a threat, then a determination is made in step 1214 whether to continue the performance of user behavior analysis operations. If so, then the process is continued, proceeding with step 1204. Otherwise, the performance of user behavior analysis operations is ended in step 1216.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a psychological profile operation, comprising:
  monitoring user interactions between a user and an information handling system;
  converting the user interactions into electronic information representing the user interactions, at least some of the user interactions being associated with corresponding user behaviors, at least some of the user interactions comprising a cyberprofile element;
  identifying contextual information related to a particular user behavior, the particular user behavior comprising a focus of the user, the focus of the user providing contextual information for the particular user behavior, the contextual information including information related to content occurring at a particular point of focus, the point of focus providing a correlation between a particular instance of focus and an associated cyberprofile element, the particular instance of focus being associated with a time interval, each of a plurality of points of focus corresponding to respective cyberprofile elements, each of the plurality of points of focus being associated with respective time intervals;

determining when the user interactions are associated with generation of an electronic communication;

associating the user interactions with the electronic communication;

generating a psychological profile of the user based upon the user interactions, the contextual information, the plurality of points of focus, the correlation between the particular instances of focus and the associated cyber profile elements and the electronic communication, the psychological profile comprising information regarding a psychological state of the user;

performing an analysis of the psychological profile of the user to determine whether the user presents a security threat due to the psychological state of the user, the analysis being performed via a security analytics system executing on a hardware processor; and, performing a threat remediation operation when the analysis of the psychological profile of the user indicates the user presents the security threat, the thread remediation operation being performed via the security analytics system.

2. The method of claim 1, wherein:
the user interactions comprise keystrokes; and,
the converting the user interactions converts the keystrokes into keystroke data representing each entered keystroke.

3. The method of claim 1, wherein:
the user interactions comprise user gestures;
the converting user interactions coverts the user gestures into user gesture data; and,
the generating the psychological profile takes into account the user gesture data.

4. The method of claim 1, wherein:
the monitoring comprises monitoring audio information associated with the user; and
further comprising
associating the audio information with the user interactions.

5. The method of claim 4, wherein:
the generating the psychological profile takes into account the audio information associated with the user interactions.

6. The method of claim 1, further comprising:
determining the focus of the user;
associating the focus of the user with a subset of user interactions; and
determining when the subset of user interactions are associated with the electronic communication.

7. A system comprising:
a processor;
a data bus coupled to the processor; and
a non-transitory, computer-readable storage medium embodying computer program code for performing a psychological profile operation, the non-transitory, computer-readable storage medium being coupled to the data bus, the computer program code interacting with a plurality of computer operations and comprising instructions executable by the processor and configured for:

monitoring user interactions between a user and an information handling system;

converting the user interactions into electronic information representing the user interactions, at least some of the user interactions being associated with corresponding user behaviors, at least some of the user interactions comprising a cyberprofile element;

identifying contextual information related to a particular user behavior, the particular user behavior comprising a focus of the user, the focus of the user providing contextual information for the particular user behavior, the contextual information including information related to content occurring at a particular point of focus, the point of focus providing a correlation between a particular instance of focus and an associated cyberprofile element, the particular instance of focus being associated with a time interval, each of a plurality of points of focus corresponding to respective cyberprofile elements, each of the plurality of points of focus being associated with respective time intervals;

determining when the user interactions are associated with generation of an electronic communication;

associating the user interactions with the electronic communication;

generating a psychological profile of the user based upon the user interactions, the contextual information, the plurality of points of focus, the correlation between the particular instances of focus and the associated cyber profile elements and the electronic communication, the psychological profile comprising information regarding a psychological state of the user performing an analysis of the psychological profile of the user to determine whether the user presents a security threat due to the psychological state of the user, the analysis being performed via a security analytics system executing on a hardware processor; and, performing a threat remediation operation when the analysis of the psychological profile of the user indicates the user presents the security threat, the thread remediation operation being performed via the security analytics system.

8. The system of claim 7, wherein:
the user interactions comprise keystrokes; and,
the converting the user interactions converts the keystrokes into keystroke data representing each entered keystroke.

9. The system of claim 7, wherein:
the user interactions comprise user gestures;
the converting user interactions coverts the user gestures into user gesture data; and,
the generating the psychological profile takes into account the user gesture data.

10. The system of claim 7, wherein:
the monitoring comprises monitoring audio information associated with the user; and
the instructions executable by the processor are further configured for:
associating the audio information with the user interactions.

11. The system of claim 10, wherein:
the generating the psychological profile takes into account the audio information associated with the user interactions.

12. The system of claim 7, wherein the instructions executable by the processor are further configured for:
determining the focus of the user;
associating the focus of the user with a subset of user interactions; and
determining when the subset of user interactions are associated with the electronic communication.

13. A non-transitory, computer-readable storage medium embodying computer program code for performing a psychological profile operation, the computer program code comprising computer executable instructions configured for:
monitoring user interactions between a user and an information handling system;
converting the user interactions into electronic information representing the user interactions, at least some of the user interactions being associated with corresponding user behaviors, at least some of the user interactions comprising a cyberprofile element;
identifying contextual information related to a particular user behavior, the particular user behavior comprising a focus of the user, the focus of the user providing contextual information for the particular user behavior, the contextual information including information related to content occurring at a particular point of focus, the point of focus providing a correlation between a particular instance of focus and an associated cyberprofile element, the particular instance of focus being associated with a time interval, each of a plurality of points of focus corresponding to respective cyberprofile elements, each of the plurality of points of focus being associated with respective time intervals;
determining when the user interactions are associated with generation of an electronic communication;
associating the user interactions with the electronic communication;
generating a psychological profile of the user based upon the user interactions, the contextual information, the plurality of points of focus, the correlation between the particular instances of focus and the associated cyber profile elements and the electronic communication, the psychological profile comprising information regarding a psychological state of the user;
performing an analysis of the psychological profile of the user to determine whether the user presents a security threat due to the psychological state of the user, the analysis being performed via a security analytics system executing on a hardware processor; and,
performing a threat remediation operation when the analysis of the psychological profile of the user indicates the user presents the security threat, the thread remediation operation being performed via the security analytics system.

14. The non-transitory, computer-readable storage medium of claim 13, wherein:
the user interactions comprise keystrokes; and,
the converting the user interactions converts the keystrokes into keystroke data representing each entered keystroke.

15. The non-transitory, computer-readable storage medium of claim 13, wherein:
the user interactions comprise user gestures;
the converting user interactions coverts the user gestures into user gesture data; and,
the generating the psychological profile takes into account the user gesture data.

16. The non-transitory, computer-readable storage medium of claim 15, wherein:
the monitoring comprises monitoring audio information associated with the user; and
the computer executable instructions are further configured for:
associating the audio information with the user interactions.

17. The non-transitory, computer-readable storage medium of claim 13, wherein:
the generating the psychological profile takes into account the audio information associated with the user interactions.

18. The non-transitory, computer-readable storage medium of claim 13, wherein the computer executable instructions are further configured for:
determining the focus of the user;
associating the focus of the user with a subset of user interactions; and
determining when the subset of user interactions are associated with the electronic communication.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *